(12) United States Patent
Sumner, Jr. et al.

(10) Patent No.: US 6,762,276 B2
(45) Date of Patent: Jul. 13, 2004

(54) HYDROGENATION OF POLYESTER OLIGOMERS CONTAINING TEREPHTHALIC ACID RESIDUES

(75) Inventors: Charles Edwan Sumner, Jr., Kingsport, TN (US); Bruce LeRoy Gustafson, Kingsport, TN (US); Robert Lin, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 130 days.

(21) Appl. No.: 10/083,944

(22) Filed: Feb. 27, 2002

(65) Prior Publication Data

US 2003/0162937 A1 Aug. 28, 2003

(51) Int. Cl.[7] .............................. C08G 63/78; C08J 3/00
(52) U.S. Cl. ....................... 528/280; 528/302; 528/308; 528/308.6; 528/307; 525/437; 525/444; 524/785
(58) Field of Search .................. 528/481, 483, 528/485, 503, 280, 302, 307, 308, 308.6; 525/437, 444; 524/785

(56) References Cited

U.S. PATENT DOCUMENTS

| | | |
|---|---|---|
| 3,487,100 A | 12/1969 | Arai et al. |
| 3,501,420 A | 3/1970 | Stevenson |
| 4,754,064 A | 6/1988 | Lillwitz |
| 5,410,000 A | 4/1995 | Borman |
| 5,597,891 A | 1/1997 | Nelson et al. |
| 5,648,032 A | 7/1997 | Nelson et al. |

FOREIGN PATENT DOCUMENTS

| | | |
|---|---|---|
| JP | 50-142357 A | 11/1975 |
| JP | 50142537 | 11/1975 |
| WO | WO 99/32526 A2 | 7/1999 |
| WO | WO 99/32529 | 7/1999 |
| WO | WO 00/9576 | 2/2000 |

*Primary Examiner*—Samuel A. Acquah
(74) *Attorney, Agent, or Firm*—Steven A. Owen; Bernie Graves

(57) ABSTRACT

Disclosed is a process of hydrogenating a polyester oligomer containing terephthalic acid residues wherein terephthalic acid residues are converted to residues of 1,4-cyclohexanedicarboxylic acid. Also disclosed is a process for the preparation of polyesters containing 1,4-cyclohexanedicarboxylic acid residues by first hydrogenating a polyester oligomer containing terephthalic acid residues and then reacting the resulting oligomer with one or more polyester-forming reactants to produce a higher molecular weight polyester.

13 Claims, No Drawings

HYDROGENATION OF POLYESTER OLIGOMERS CONTAINING TEREPHTHALIC ACID RESIDUES

FIELD OF THE INVENTION

This invention pertains to a process of hydrogenating a polyester oligomer containing terephthalic acid residues wherein terephthalic acid residues are converted to residues of 1,4-cyclohexanedicarboxylic acid. This invention also pertains to a process for the preparation of polyesters containing 1,4-cyclohexane-dicarboxylic acid residues by first hydrogenating a polyester oligomer containing terephthalic acid residues and then reacting the resulting oligomer with one or more polyester-forming reactants to produce a higher molecular weight polyester.

BACKGROUND OF THE INVENTION

Copolyesters comprising terephthalic acid and ethylene glycol residues and residues of one or more saturated dicarboxylic acids comprise a growing market of specialty polyesters. The incorporation of a saturated comonomer such as 1,4-cyclo-hexanedicarboxylic acid (CHDA) into the polyethylene terephthalate (PET) framework can impart desirable properties, e.g., slower crystallization rates, to the resulting polyester. Copolyesters normally are prepared by reaction of a purified dicarboxylic acid such as CHDA and diols under polymerizing conditions. Copoyesters derived from CHDA or a diester therof are significantly more expensive due to the cost of the CHDA monomer. For example, 1,4-CHDA normally is prepared commercially from terephthalic acid (TPA) by the ruthenium-catalyzed hydrogenation of the disodium salt of TPA, followed by neutralization and separation of the resulting CHDA from aqueous sodium salts. The present invention provides a process for the production of copolyesters containing CHDA residues by the hydrogenation of polyester oligomers containing TPA residues.

Hydrogenation processes of involving terephthalic acid esters derived from poly(ethylene terephthalate) are known. U.S. Pat. No. 3,501,420 discloses the depolymerization of waste poly(ethylene terephthalate) in an alcohol to give a solution of terephthalic acid esters. The resulting solution is hydrogenated to remove color bodies. In this process, poly (ethylene terephthalate) is converted to primarily monomeric esters before contact with hydrogen. The decolorized solution of TPA esters may be used to prepare high-quality poly(ethylene terephthalate).

U.S. Pat. No. 3,487,100 discloses that bis-hydroxyethyl terephthalate (BHET) prepared from crude TPA and ethylene glycol may be decolorized by treatment with hydrogen in the presence of a hydrogenation catalyst. The BHET is dissolved in water and filtered to remove oligomeric species (which are insoluble in water). The filtered solution is treated with hydrogen at a temperature range of 50–100C. Although the hydrogenation treatment reduces fluorenone impurities, the BHET must be in solution and the product must be crystallized from solution before further use. Another disadvantage is that polyester oligomers cannot be processed by this method. Japanese Kokai JP 50-142537 discloses a process to produce cyclo-hexanedimethanol (CHDM) by the depolymerization and hydrogenation of waste poly(ethylene terephthalate). In this process, waste PET is depolymerized with a 7-fold excess of ethylene glycol in the presence of hydrogen and a hydrogenation catalyst to convert poly(ethylene terephthalate) into a solution of ethylene glycol esters of cyclohexanedicarboxylic acid. The product of this step is separated from the catalyst and treated again with hydrogen at high pressure in the presence of a second hydrogenation catalyst. The object of the second step is to convert the esters of cyclohexanedicarboxylic acid into a solution of CHDM.

SUMMARY OF THE INVENTION

We have developed a process whereby a polyester oligomer, i.e., a low molecular weight polyester, comprising residues of TPA and one or more diols may be hydrogenated under certain conditions to convert at least 1 mole percent of the TPA residues to CHDA residues. Accordingly, one embodiment of the present invention is a process wherein a polyester oligomer comprising terephthalic acid residues is contacted with hydrogen in the presence of a supported or suspended hydrogenation catalyst under a hydrogen pressure of at least about 60 bars gauge (barg; about 870 pounds per square inch gauge—psig) and a temperature of about 180 to 280° C. whereby at least 1 mole percent of the terephthalic acid residues are converted to 1,4-cyclohexanedicarboxylic acid residues. A second embodiment of the present invention is a process comprising the steps of:

(1) contacting a polyester oligomer comprising terephthalic acid residues with hydrogen in the presence of a supported or suspended hydrogenation catalyst under a hydrogen pressure of at least about 60 barg and a temperature of about 180 to 280° C. to convert at least 1 mole percent of the terephthalic acid residues to 1,4-cyclohexanedicarboxylic acid residues; and (2) reacting the oligomer product of step (1) with one or more polyester-forming reactants in the presence of a polymerization catalyst and under polymerization conditions of pressure and temperature to produce a polyester comprising 1,4-cyclohexanedicarboxylic acid residues.

The present invention offers a more economical means for preparing copolyesters containing TPA and CHDA residues. The resulting oligomer comprised of comonomers may be polymerized by conventional means to produce copolyesters of saturated and unsaturated monomers. The polyesters which may be obtained in accordance with the present invention have a variety of uses such as adhesives, food packaging and coating compositions.

DETAILED DESCRIPTION OF THE INVENTION

The oligomer used in the invention typically is produced by esterifying terephthalic acid, or a diester thereof such as dimethyl terephthalate, with one or more diols such as ethylene glycol, diethylene glycol, 1,3-butanediol, 1,4-cyclo-hexanedimethanol, and the like. The product of the esterification reaction is an oligomer mixture having a degree of polymerization (DP) of about 2 to 20. The oligomer preferably has a DP of about 2 to 10, most preferably about 3 to 5, wherein DP is defined as the number average molecular weight of the oligomer divided by the molecular weight of the repeat unit. The oligomers which may be employed in the present invention also may be characterized by the general formula:

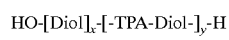

HO-[Diol]$_x$-[-TPA-Diol-]$_y$-H wherein Diol is a divalent residue of a diol or glycol component such as ethylene glycol, diethylene glycol, 1,2- and 1,3 propanediol, 2-methyl-1,3-propanediol, 2,2-dimethyl-1,3-propanediol, 1,4-butanediol, 1,4-cyclohexanedimethanol, and the like, TPA is the divalent residue of terephthalic acid, x is 0 or 1, and y has an average value of about 2 to 20. The oligomer starting material of our novel process is insoluble in water and thus is distinguished from BHET that is hydrogenated as described in U.S. Pat. No. 3,487,100.

The oligomer may be preared using crude terephthalic acid, purified terephthalic acid, or a polyester-forming derivative such as dimethyl terephthalate. Crude terephthalic acid (CTA), prepared by the autoxidation of para-xylene, typically contains 4-carboxybenzaldehyde (CBA) as the major impurity and minor but significant amount of colored impurities. The colored impurities have been identified as a mixture of mainly dicarboxyfluorenone isomers (with lesser amounts of mono- and tri-carboxyfluorenones) and dicarboxybenzil. These highly-colored carboxyfluorenone compounds may be hydrogenated to colorless carboxyfluorene compounds. Other compounds such as dicarboxybenzophenone and dicarboxybiphenyl have been identified in low concentrations. Although essentially any grade of CTA can be used in the preparation of the oligomers employed as the starting material for the process of the present invention, the CTA used typically contains less than about 4000 ppm of CBA, preferably less than 700 ppm CBA, and most preferably from about 50 to 250 ppm CBA.

CTA typically is reacted with at least one diol at a temperature between about 200 and about 280° C. to produce an oligomer which may be hydrogenated in accordance with the present invention. Suitable esterification pressures include, but are not limited to those up to about 27.6 barg (400 psig) and preferably up to about 13.8 barg (200 psig). The reaction can be self-acid catalyzed or catalyzed with a suitable esterification catalyst such as titanium or organic or inorganic acids. The oligomer mixture typically is produced continuously in a series of one or more reactors. Two reactors frequently are used in commercial operation. Alternatively, the monomer and oligomer mixture may be produced in one or more batch reactors. Suitable reactors for esterification are known in the art and need not be described here. The esterification is generally conducted from about 1 to about 4 hours. It should be understood that generally, the lower the reaction temperature, the longer the reaction time. Oligomer prepared from CTA typically has a b* value of at least 3, typically in the range of about 4 to 7, as determined using a L,a,B Color scale b* color measurement measured using ASTM color test on a Hunter Ultra Scan 8000 spectrometer.

The process of our invention may be carried out by contacting a melt of the terepthalic acid-containing oligomer with hydrogen in the presence of a supported or suspended catalyst at a temperature of about 180 to 280° C. (depending upon the content of ethylene glycol) and a hydrogen pressure of at least about about 60 barg. The preferred conditions comprise temperatures in the range of about 240 to 270° C., in some embodiments, more preferably about 250° C. to 260° C., and hydrogen pressures in the range of about 70 to 170 barg (about 1016 to 2467 psig), more preferably about 100 to 140 barg (about 1450 to 2031 psig). Suitable hydrogenation times include those up to about three hours. It should be appreciated that hydrogenation times will vary with the amount and activity of the catalyst selected as well as the partial pressure of hydrogen and mode of operation. The hydrogenation process may be carried out in a batch, semi-continuous or continuous mode of operation using a slurry or fixed bed of catalyst. The process preferably is carried out in a continuous mode of operation utilizing a trickle bed reactor wherein a melt of the oligomer flows over and through one or more beds of a supported hydrogenation catalyst at elevated temperature and pressure. The hydrogenation may be carried out in the presence of a diluent such as the diol, e.g., ethylene glycol, used in the preparation of the oligomer. The amount of diluent used may be in the range of about 5 to 50 weight percent based on the weight of the oligomer.

Examples of the hydrogenation catalysts which may be used in our novel process include the platinum group metals, such as ruthenium, rhodium, palladium, platinum and osmium. Nickel also may be used. Suitable catalysts are commercially available from Englehard and Sud Chemie. Preferred hydrogenation catalysts include palladium, platinum and nickel catalysts, especially supported catalysts comprising about 0.1 to 10 weight percent palladium or platinum on a catalyst support material. Suitable catalyst support materials include, but are not limited to, $ZrO_2$, carbon, silica, alumina, zeolites, $TiO_2$ and mixtures thereof with carbon being preferred. The oligomer which has been hydrogenated in accordance with the present invention has a b* values of less than about 3, preferably less than about 2, and contains less than 250 ppm CBA. The process of the present invention converts at least 1 mole percent, more typically from about 10 to 50 mole percent, of the terephthalic acid residues present in the oligomeric mixture to 1,4-cyclohexanedicar-boxylic acid residues.

The hydrogenated oligomer mixture may be polymerized by conventional methods to produce a polyester. The composition and properties of the final polyester may be varied by reacting or polymerizing the hydrogenated oligomer mixture with other copolymerizable compounds or materials such as, for example, a polyester oligomer which has not been hydrogenated or has been hydrogenated under different conditions to give an oligomer product containing more or less 1,4-cyclohexanedicarboxylic acid residues. The hydrogenated oligomer mixture also may be reacted with dicarboxylic acids and/or diols different from those from which the oligomer is prepared.

The polymerization or polycondensation is conducted in conventional reactors, which are known in the art in continuous or batch modes. Suitable polycondensation catalysts include compounds of titanium, gallium, germanium, tin, antimony, aluminum, bismuth, silicon, zirconium, compounds of antimony, germanium, titanium or mixtures thereof are preferred. The amount of catalyst added is from about 5 to about 400 ppm and preferably between about 20 to about 300 ppm when germanium or antimony is used. The oligomer mixture undergoes melt-phase polycondensation to produce a precursor polymer which has a degree of polymerization from about 20 to about 120. The precursor polyester is produced in a series of one or more reactors operating at elevated temperatures. To facilitate removal of excess glycols, water, alcohols and other reaction products, the polycondensation reactors are run under a vacuum or purged with an inert gas. Inert gas is any gas that does not cause unwanted reactions or product characteristics. Suitable gases include, but are not limited to $CO_2$, argon, helium, and nitrogen.

The polyester product from the polycondensation reaction often is pelletized for ease of handling. For crystallizable polyesters, the polyester is then crystallized and polymerized further in the solid state, using equipment and conditions which are known in the art. However, crystallizable polyesters of the present invention may also be fed directly to molding equipment without pelletization or solid stating, by processes such as, but not limited to those which are disclosed in U.S. Pat. Nos. 5,597,891 and 5,648,032.

The hydrogenation process of the present invention normally is carried out on the oligomer which is formed in the process of making high molecular weight polyesters. However, it may be possible to utilize the present invention at other points in the polyester manufacturing process so long as the feed material to be hydrogenated is in a liquid form capable of being pumped through the selected hydrogenation reactor and contacting the catalyst to effect the desired reaction. For example, the hydrogenation feed also may be a prepolymer. The hydrogenation step may be performed as early as the first oligomer-forming reactor when a granular hydrogenation catalyst is used and as early as between the first and second oligomer-forming reactors using a fixed and/or trickle bed reactor. It may be possible to conduct the hydrogenation step between esterification and polycondensation, after polycondensation, or at any point in between. In embodiments wherein the selected polycondensation catalyst reacts with the hydrogenation catalyst it may be preferable to conduct the hydrogenation prior to adding the polycondensation catalyst.

The polyesters derived from the oligomers hydrogenated in accordance with the present invention include polyester homopolymers and copolymers that are suitable for use in a wide variety of applications including packaging, film, sheet, coatings, adhesives, molded articles and the like. Food packaging is a particularly preferred use for certain polyesters of the present invention. The polyesters comprise a dicarboxylic acid residue component comprising 1,4-cyclohexanedicarboxylic acid residues and, optionally, one or more other dicarboxylic acids such as terephthalic acid and/or isophthalic acid residues, preferably from about 1 to 50 mole percent 1,4-cyclohexanedicarboxylic acid residues, and more preferably about 2 to 10 mole percent 1,4-cyclohexanedicarboxylic acid residues and a diol residue component comprising residues of at least one diol such as the divalent residues of ethylene glycol, 1,4-cyclohexanedimethanol, diethylene glycol, butanediol and mixtures thereof. The polyesters may further comprise comonomer residues in amounts up to about up to about 50 mole percent of one or more different dicarboxylic acids and or up to about up to about 50 mole percent of one or more diols on a 100 mole percent dicarboxylic acid and a 100 mole % diol basis. In certain embodiments comonomer modification of the dicarboxylic acid component, the glycol component or each individually of up to about 25 mole percent or up to about 15 mole percent may be preferred. More specifically suitable dicarboxylic acid comonomers include aromatic dicarboxylic acids preferably having 12 to 14 carbon atoms, or aliphatic dicarboxylic acids preferably having 4 to 12 carbon atoms. Examples of dicarboxylic acid comonomers comprise phthalic acid, isophthalic acid, naphthalene-2,6-dicarboxylic acid, cyclohexanediacetic acid, diphenyl-4,4'-dicarbox-ylic acid, dipheny-3,4'-dicarboxylic acid, succinic acid, glutaric acid, adipic acid, azelaic acid, sebacic acid, mixtures thereof and the like.

Suitable diol comonomers comprise cycloaliphatic diols preferably having 6 to 20 carbon atoms or aliphatic diols preferably having 3 to 20 carbon atoms. Examples of such diols comprise triethylene glycol, propane-1,3-diol, butane-1,4-diol, pentane-1,5-diol, hexane-1,6-diol, neopentyl glycol, 3-methylpentane-2,4-diol, 2-methyl-1,4-pentanediol, 2,2,4-trimethylpentane-diol-(1,3), 2-ethylhexane-1,3-diol, 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclo-butane, 2,2,4,4-tetramethylcyclobutanediol, 2,2-bis-(3-hydroxyethoxyphenyl)-propane, 2,2-bis-(4-hydroxypropoxyphenyl)-propane, isosorbide, hydroquinone, mixtures thereof and the like. Polyesters may be prepared from two or more of the above diols.

The polyesters of the present invention may also contain small amounts of trifunctional or tetrafunctional comonomers such as trimellitic anhydride, trimethylolpropane, pyromellitic dianhydride, pentaerythritol, and other polyester forming polyacids or polyols generally known in the art. Also, although not required, additives normally used in polyesters may be used if desired. Such additives include, but are not limited to colorants, toners, pigments, carbon black, glass fibers, fillers, impact modifiers, antioxidants, stabilizers, flame retardants, reheat aids, acetaldehyde reducing compounds, oxygen scavenging compounds, barrier improving additives, such as platelet particles and the like. The polyesters derived from the oligomers hydrogenated in accordance with the present invention preferably are produced by polymerizing the hydrogenated oligomer mixture and are comprised of:

(i) diacid residues comprising 1,4-cyclohexanedicarboxylic acid residues and terephthalic acid residues; and (ii) diol residues comprising ethylene glycol residues.

As used in the specification and concluding claims, residue refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— repeat units in the polyester, regardless of whether ethylene glycol is used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

Copolymers of isophthalic acid and 1,3-cyclohexanedicarboxylic acid may be produced from crude isophthalic acid without first producing purified 1,3-cyclohexane-dicarboxylic acid since isophthalic acid also may be converted to the corresponding cyclohexanedicarboxylic acid by the hydrogenation treatment. Similar processing steps are removed or avoided for the 1,3-cyclohexanedicarboxylic acid process as described in the 1,4-cyclohexanedicarboxylic acid process. Thus, another embodiment of the present invention concerns a process comprising contacting a polyester oligomer comprising isophthalic acid (IPA) residues with hydrogen in the presence of a supported or suspended hydrogenation catalyst under a hydrogen pressure of at least about 60 bars gauge (barg) and a temperature of about 180 to 280° C. whereby at least 1 mole percent, preferably about 10 to 50 mole percent, of the isophthalic acid residues are converted to 1,3-cyclohexanedicarboxylic acid residues. The preferred conditions and oligomers, wherein the terephthalic acid reisudes are replaced with isophthalic acid residues, described above may be used in the process of hydrogenating a polyester oligomer comprising isophthalic acid residues to convert at least 1 mole percent, preferably about 10 to 50 mole percent, of the isophthalic acid residues to 1,3-cyclohexanedicarboxylic acid residues.

EXAMPLES

The processes provided by the present invention are further illustated by the following examples. Unless specified otherwise, all percentages given in the examples are by weight.

Examples 1–5

A 300 mL titanium autoclave equipped with a glass liner was charged with a poly(ethylene terephthalate) oligomer (100 g) having a degree of polymerization of 5.1. The oligomer was prepared by the reaction of ethylene glycol and CTA in a 1.3/1 mole ratio respectively at 260° C. for 2 hours. The hydrogenation catalyst (8 g) was added and the resulting mixture was pressurized to 34.3 barg (about 500 psig) with hydrogen. The mixture was heated to 210–260° C. for 180 minutes while the pressure was maintained at 68.9–124 barg (approximately 1000–1800 psig) with hydrogen. After cooling, the mixture was removed from the autoclave and ground into a powder (after removal of large catalyst particles). Examples 1, 4, and 7 contained 17% ethylene glycol added before hydrogenation in order to lower the melting range of the oligomer.

A sample of the oligomer hydrogenated in each example was saponified with methanol and analyzed by gas chromatography for the methyl esters of cyclohexane-dicarboxylic acid. The examples are summarized in Table I wherein Press is the hydrogen pressure (barg), Temp is the temperature (° C.) and the value given for CHDA is the approximate mole percent of the diacid residues of the oligomer represented by 1,4-cyclohexanedicarboxylic acid residues.

TABLE I

| Example No. | Catalyst | Temp | Press | CHDA |
|---|---|---|---|---|
| 1 | 1% Pd + 0.1% Ni on Alumina | 210 | 70 | 2 |
| 2 | 1% Pd + 0.1% Ni on Alumina | 230 | 70 | 12 |
| 3 | 1% Pd + 0.1% Ni on Alumina | 230 | 124 | 72 |
| 4 | 1% Pd + 0.1% Ni on Alumina | 230 | 124 | 35 |
| 5 | 1% Pd + 0.1% Ni on Alumina | 260 | 70 | 56 |
| 6 | 1% Pd + 0.1% Ni on Alumina | 260 | 124 | 43 |
| 7 | 3% Pd on Silica | 210 | 124 | 15 |
| 8 | 3% Pd on Silica | 230 | 124 | 44 |
| 9 | 3% Pd on Silica | 230 | 124 | 16 |
| 10 | 3% Pd on Silica | 260 | 124 | 15 |
| 11 | 3% Pd on Silica | 260 | 124 | 20 |
| 12 | 1% Pd on Titania | 230 | 124 | 23 |
| 13 | 1% Pd on Titania | 260 | 124 | 12 |
| 14 | 1% Ru on Carbon | 230 | 70 | 12 |
| 15 | 1% Pd on Carbon | 230 | 124 | 4 |

The invention has been described in detail with particular reference to preferred embodiments thereof, but it will be understood that variations and modifications can be effected within the spirit and scope of the invention.

We claim:

1. Process which comprises contacting a polyester oligomer comprising terephthalic acid residues with hydrogen in the presence of a supported or suspended hydrogenation catalyst under a hydrogen pressure of at least about 60 bars gauge (barg) and a temperature of about 180 to 280° C. whereby at least 1 mole percent of the terephthalic acid residues are converted to 1,4-cyclohexanedicar-boxylic acid residues.

2. Process according to claim 1 wherein a polyester oligomer comprising terephthalic acid residues having a degree of polymerization of about 2 to 20 is contacted with hydrogen under a hydrogen pressure of at least about 70 to 170 barg and a temperature of about 240 to 270° C.

3. Process according to claim 1 wherein a polyester oligomer comprising terephthalic acid residues having a degree of polymerization of about 2 to 10 is contacted with hydrogen in the presence of a supported or suspended hydrogenation catalyst selected from catalysts comprising about 0.1 to 10 weight percent palladium or platinum on a catalyst support material under a hydrogen pressure of at least about 70 to 170 barg and a temperature of about 240 to 270C.

4. Process according to claim 3 wherein the polyester oligomer has a degree of polymerization of about 2 to 10.

5. Process which comprises contacting a polyester oligomer having the formula

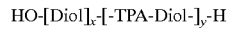

wherein Diol is a divalent residue of a diol component, TPA is the divalent residue of terephthalic acid, x is 0 or 1, and y has an average value of about 2 to 20 in the presence of a supported or suspended hydrogenation catalyst selected from catalysts comprising about 0.1 to 10 weight percent palladium or platinum on a catalyst support material under a hydrogen pressure of at least about 70 to 170 barg and a temperature of about 240 to 270° C. whereby at least 1 mole percent of the terephthalic acid residues are converted to 1,4-cyclohexanedicarboxylic acid residues.

6. Process according to claim 5 wherein Diol is a divalent residue of a diol component selected from ethylene glycol, diethylene glycol, 1,2- and 1,3-propane-diol, 2-methyl-1,3-propanediol, 2,2-dimethyl-1,3-propanediol, 1,4-butanediol, and 1,4-cyclohexanedimethanol and about 10 to 50 mole percent of the terephthalic acid residues are converted to 1,4-cyclohexanedicarboxylic acid residues.

7. Process for the preparation of a polyester which comprises the steps of:

(1) contacting a polyester oligomer comprising terephthalic acid residues with hydrogen in the presence of a supported or suspended hydrogenation catalyst under a hydrogen pressure of at least about 60 barg and a temperature of about 180 to 280° C. to convert at least 1 mole percent of the terephthalic acid residues to 1,4-cyclohexanedicarboxylic acid residues; and (2) reacting the oligomer product of step (1) with one or more polyester-forming reactants in the presence of a polymerization catalyst and under polymerization conditions of pressure and temperature to produce a polyester comprising 1,4-cyclohexanedicarboxylic acid residues.

8. Process according to claim 7 comprising the steps of:

(1) contacting a polyester oligomer having the formula

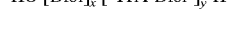

wherein Diol is a divalent residue of a diol component, TPA is the divalent residue of terephthalic acid, x is 0 or 1, and y has an average value of about 2 to 20 in the presence of a supported or suspended hydrogenation catalyst selected from catalysts comprising about 0.1 to 10 weight percent palladium or platinum on a catalyst support material under a hydrogen pressure of at least about 70 to 170 barg and a temperature of about 240 to 270° C. whereby at least 1 mole percent of the terephthalic acid residues are converted to 1,4-cyclohexanedicarboxylic acid residues; and (2) reacting the oligomer product of step (1) with one or more polyester-forming reactants in the presence of a polymerization catalyst and under polymerization conditions of pressure and temperature to produce a polyester comprising 1,4-cyclohexanedicarboxylic acid residues.

9. Process according to claim 8 wherein, in step (1), Diol is a divalent residue of a diol component selected from ethylene glycol, diethylene glycol, 1,2- and 1,3-propanediol, 2-methyl-1,3-propanediol, 2,2-dimethyl-1,3-propanediol, 1,4-butanediol, and 1,4-cyclohexanedimethanol and about 10 to 50 mole percent of the terephthalic acid residues are converted to 1,4-cyclohexanedicarboxylic acid residues.

10. Process for the preparation of a polyester which comprises the steps of:

(1) contacting a polyester oligomer having the formula

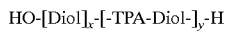

wherein Diol is a divalent residue of ethylene glycol, TPA is the divalent residue of terephthalic acid, x is 0 or 1, and y has an average value of about 2 to 20 in the presence of a supported or suspended hydrogenation catalyst selected from catalysts comprising about 0.1 to 10 weight percent palladium or platinum on a catalyst support material under a hydrogen pressure of at least about 70 to 170 barg and a temperature of about 240 to 270° C. whereby about 10 to 50 mole percent of the terephthalic acid residues are converted to 1,4-cyclohexanedicar-boxylic acid residues; and (2) polymerizing the oligomer product of step (1) in the presence of a polymerization catalyst and under polymerization conditions of pressure and temperature to produce a polyester comprising 1,4-cyclohexanedicarboxylic acid residues.

11. Process which comprises contacting a polyester oligomer comprising isophthalic acid residues with hydrogen in the presence of a supported or suspended hydrogenation catalyst under a hydrogen pressure of at least about 60 bars gauge (barg) and a temperature of about 180 to 280° C. whereby at least 1 mole percent of the isophthalic acid residues are converted to 1,3-cyclohexanedicarboxylic acid residues.

12. Process which comprises contacting a polyester oligomer having the formula

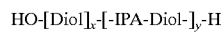

wherein Diol is a divalent residue of a diol component, IPA is the divalent residue of isophthalic acid, x is 0 or 1, and y has an average value of about 2 to 20 in the presence of a supported or suspended hydrogenation catalyst selected from catalysts comprising about 0.1 to 10 weight percent palladium or platinum on a catalyst support material under a hydrogen pressure of at least about 70 to 170 barg and a temperature of about 240 to 270° C. whereby at least 1 mole percent of the isophthalic acid residues are converted to 1,3-cyclohexanedicarboxylic acid residues.

13. Process according to claim 12 wherein Diol is a divalent residue of a diol component selected from ethylene glycol, diethylene glycol, 1,2- and 1,3-propane-diol, 2-methyl-1,3-propanediol, 2,2-dimethyl-1,3-propanediol, 1,4-butanediol, and 1,4-cyclohexanedimethanol and about 10 to 50 mole percent of the isophthalic acid residues are converted to 1,3-cyclohexanedicarboxylic acid residues.

* * * * *